United States Patent Office 3,511,411
Patented May 12, 1970

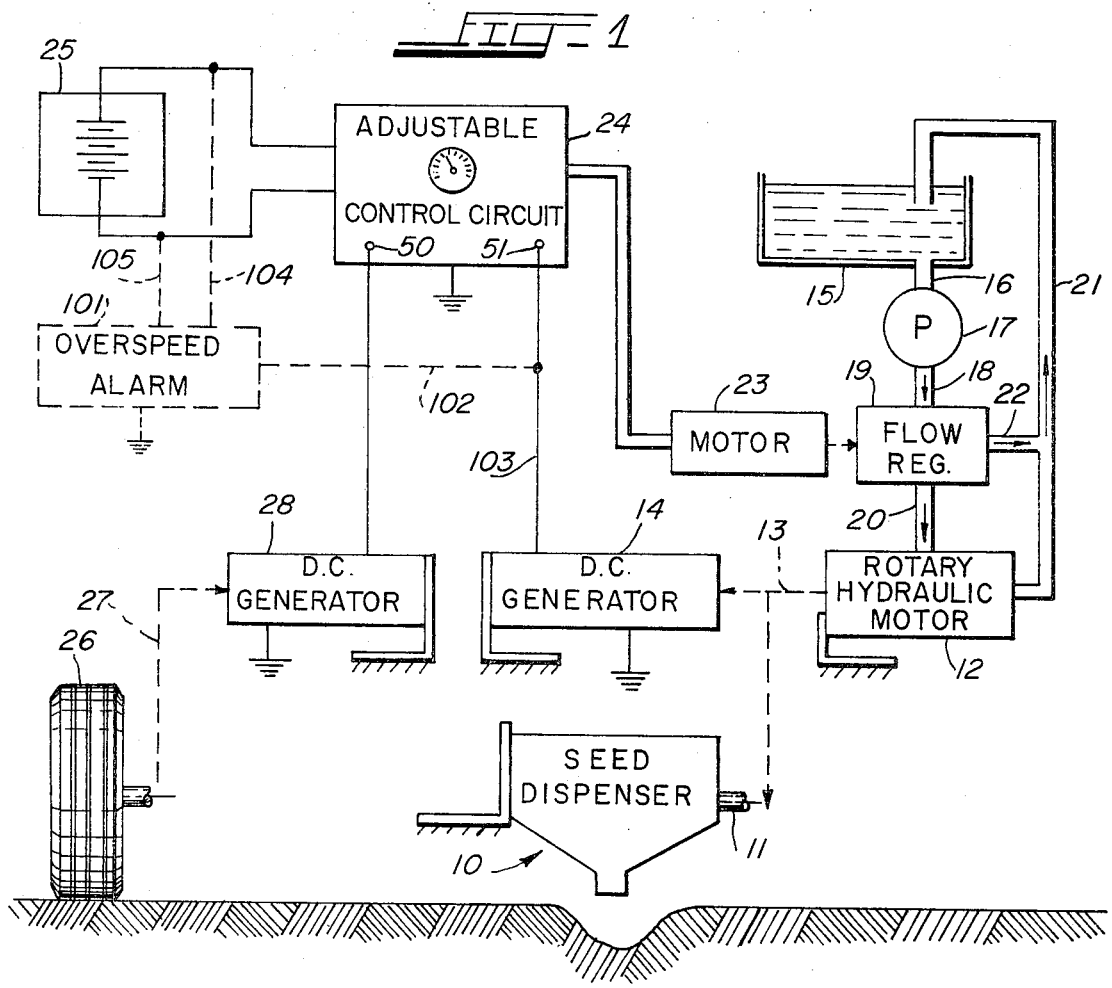
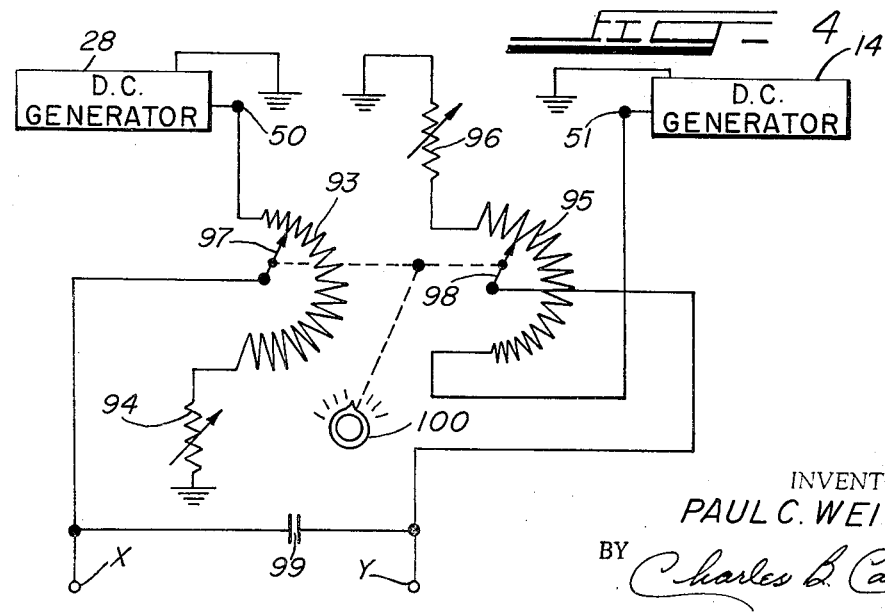

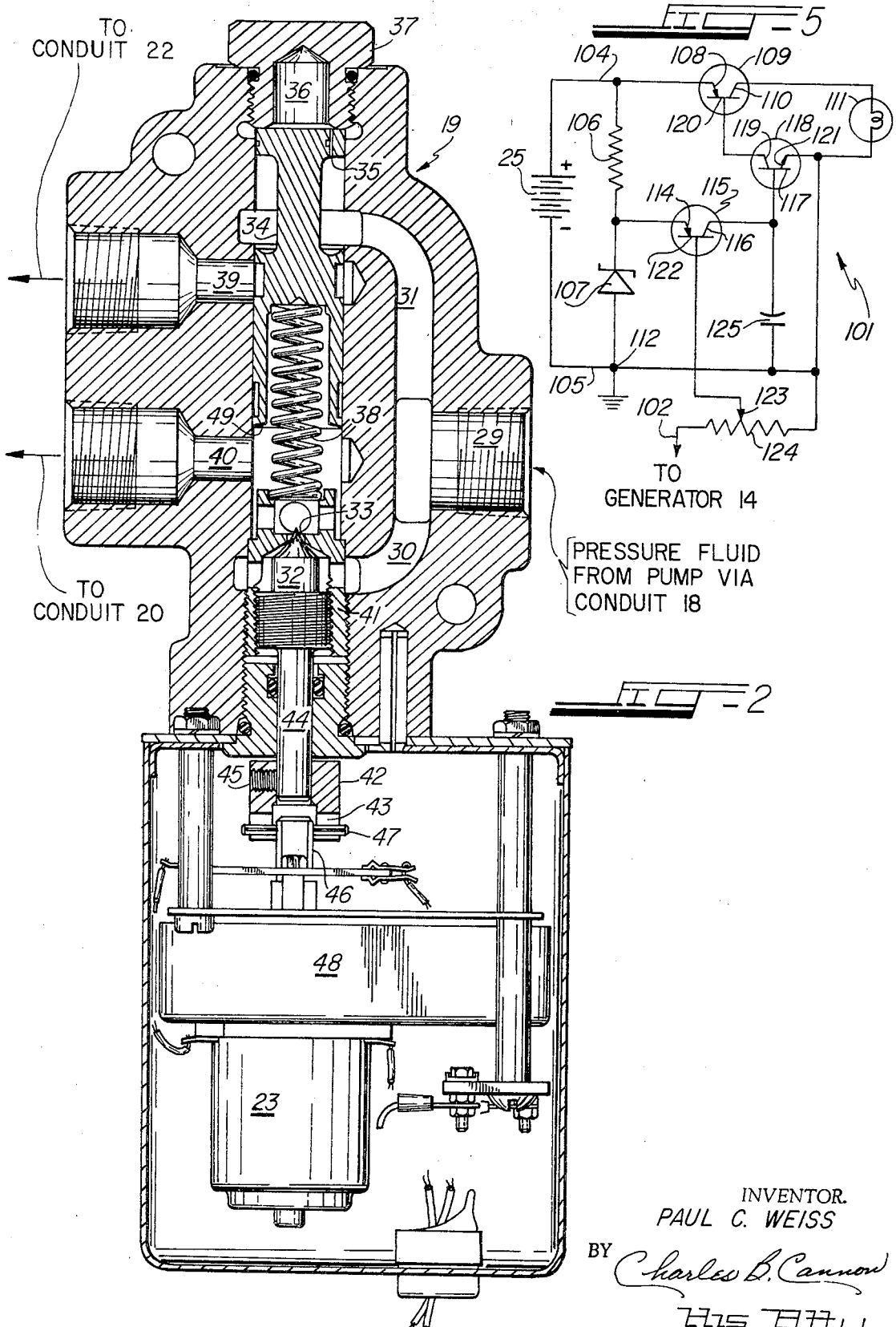

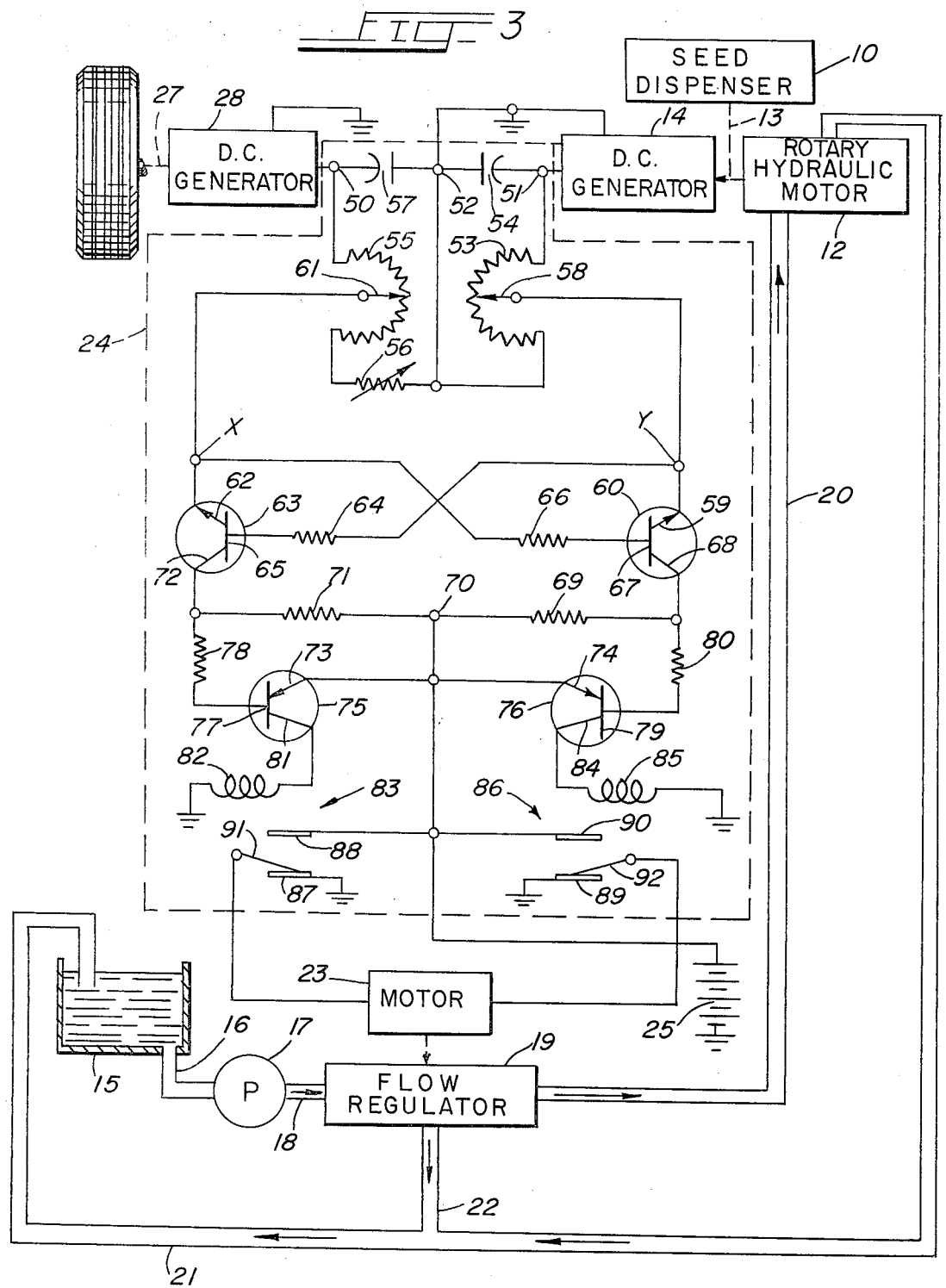

3,511,411
APPARATUS FOR CONTROLLING PLANTING AND MATERIAL SPRAYING AND SPREADING DEVICE
Paul C. Weiss, Evanston, Ill., assignor, by mesne assignments, to AMBAC Industries, Incorporated, Garden City, N.Y., a corporation of New York
Filed Dec. 11, 1967, Ser. No. 689,503
Int. Cl. B67d 5/08
U.S. Cl. 222—52    5 Claims

ABSTRACT OF THE DISCLOSURE

The voltage from a tachometer driven by a ground wheel is compared with the voltage from a second tachometer driven by a rotary hydraulic motor which powers an agricultural implement or the like. A control circuit adjusts a fluid flow regulator in response to departure of said voltages from a given ratio. The flow regulator, in turn, controls the supply of power to the hydraulic motor for determining its speed. An auxiliary circuit provides an alarm indication when the hydraulic motor speed exceeds a predetermined magnitude.

---

The present invention relates to apparatus for operating a device at a controlled rate as a function of its movement relative to a surface. More particularly it relates to an arrangement for controlling agricultural implements or the like.

While the invention is not limited thereto it is especially well suited for controlling agricultural equipment such as seed planters, fertilizer distributors, combine reels, cotton picker drums and the like. As applied to agricultural planters, for example, the invention eliminates the gear and sprocket drives which have been used heretofore in the timing and control mechanisms.

In present day seed planters the tractor must be stopped and the operator must dismount to effect a change in adjustment. The mechanisms for ensuring accurate dispensing are involved and cumbersome, subject to frequent breakdown, and are difficult and time consuming to adjust for a change in application rate.

The present invention provides a system whereby the operator has complete control of the rate of deposit of the distributing mechanism through the adjustment of a simple control knob on his instrument panel. The operation of the device is automatically compensated for ground speed rendering the application density independent thereof. Continuously variable selection of the seeding rate is provided as compared with the step-wise control available heretofore. Change in the rate of application is instantly available, it being possible to effect such changes while the vehicle remains in motion.

As applied to harvesting equipment, the present invention permits the operator to control the speed of rotation of the combine reel, for example, relative to the ground speed. This is particularly advantageous since with certain types of light crops the peripheral speed of the reel can be maintained just slightly faster than ground speed to avoid excessive beating. On the other hand, with dense crops, or crops bent by the elements, the reel can be operated at increased speed relative to ground speed. The operator is provided with complete control for most efficient handling suited to the prevailing conditions. As the machine advances across the field, reel speed can be adjusted quickly to allow for changing conditions. In each case the reel speed is maintained in fixed relation to the ground speed for any given adjustment selected by the operator.

In accordance with the invention there is provided an arrangement for controlling the speed of operation of a device as a function of its rate of movement relative to a surface comprising in combination: a rotary hydraulic motor for driving the device; means for supplying fluid under pressure to the hydraulic motor for energizing the same; control means operatively associated with the motor for controlling its speed; first signal producing means responsive to operation of the hydraulic motor for generating a first electric signal having a parameter proportional to the speed of rotation of the motor; second signal producing means for producing a second electric signal having a parameter proportional to the relative speed of movement between the device and the surface; and an adjustable control circuit coupling the first and second signal producing means to the control means and responsive to the parameters of the signals for controlling the speed of the motor to maintain it in a predetermined relation to the speed of movement between the device and the surface.

The invention will be better understood after reading the following detailed description of the presently preferred embodiments thereof with reference to the appended drawings in which:

FIG. 1 is a diagrammatic representation of the system as applied to a planter mechanism;

FIG. 2 is a vertical sectional view showing details of construction of the flow regulator and motor control, forming a part of the system of FIG. 1;

FIG. 3 is a part schematic, part diagrammatic representation of the system of FIG. 1 showing the details of the adjustable control circuit;

FIG. 4 is a fragmentary schematic representation of a modification of the control circuit of FIG. 3; and FIG. 5 is a schematic diagram of the details of the over-speed alarm circuit shown as an optional component of the system of FIG. 1.

Throughout the drawings the same reference numerals are used to designate the same or similar part.

Referring now to FIG. 1, there is represented generally at 10 a seed dispensing mechanism normally associated with an agricultural planter. The details of construction of the dispenser are unimportant. Any known dispensing apparatus which can receive or can be adapted to receive its driving power from a rotating shaft can be controlled by the apparatus in accordance with the present invention. The drive shaft 11 of the dispenser is coupled in driven relationship to the rotary hydraulic motor 12 over a suitable mechanical connection or link 13. A D.C. tachometer generator 14 is also driven by the hydraulic motor 12 by way of the connection 13.

Fluid power for the hydraulic motor 12 is obtained from the reservoir 15 by way of conduit 16, pump 17, conduit 18, flow regulator 19, conduit 20, and return conduit 21. A branch conduit 22, interconnecting the flow regulator with the conduit 21, functions as a flow bypass.

Mechanically coupled to the flow regulator for controlling its adjustment is an electric motor 23. The electric motor receives its operating energy from an adjustable control circuit 24 which is energized by the source 25.

As part of the apparatus there is also provided a ground wheel 26 which is coupled by linkage 27 in driving relation to a second D.C. tachometer generator 28. As shown, both generators 14 and 28 have their electrical output coupled to the adjustable control circuit 24 via input terminals 51 and 50, respectively.

Details of construction of the flow regulator and the means for controlling it are shown in FIG. 2 to which attention is now directed. Fluid under pressure from pump 17 is applied to the flow regulator through input port 29. The fluid divides and fills the branch passages 30 and 31. Passage 30 leads to a needle valve 32 which cooperates with an orifice 33. As shown in the drawing, the valve is arranged in closed or shut position. Hence, pressure will initially build up in passage 31 and in the chamber surrounding the reduced portion of the valve spool 34. Fluid will pass through the restricted passage 35 in the end land of spool 34 entering the cavity 36 defined by the rear face of spool 34 and the plug 37. As soon as the pressure in the cavity 36 is sufficient to overcome the force of the spring 38, the spool 34 will be displaced downwardly, as seen in the drawing, exposing a port 39 which is connected to bypass conduit 22. The construction is such that with enough pump pressure acting upon spool 34 to overcome the force of spring 38 the port 39 will be opened fully. Since needle valve 32 is occluding orifice 33, no fluid will pass through the orifice to the port 40 which is coupled via conduit 20 to the hydraulic motor 12.

The needle valve 32 is threadedly supported in a bushing 41. A collar 42 with a transverse slot 43 is mounted on the exposed end of the shank 44 of the needle valve 32. The collar 42 is held in place by a set screw 45. A control shaft 46 carries a cross-pin 47 riding in the slot 43 of the collar 42. The shaft 46 receives its driving power from a gear box 48 which, in turn, is driven by motor 23.

When it is desired to energize the rotary hydraulic motor 12, the motor 23 is energized to rotate and retract the needle valve 32. As soon as orifice 33 is opened, fluid will pass therethrough from passage 30 against the face 49 of spool valve 34. It will be understood that the spool valve is initially in its downward position such as to occlude the port 40. As pressure builds up against the spool face 49 it will cooperate with the force of spring 38 to overcome the opposing pressure in cavity 36 between the rear face of the spool 34 and plug 37. The spool valve will move upwards permitting access of fluid to port 40 and gradually restricting the passage of fluid to port 39. In known manner, the spool valve 34 will tend to maintain the pressure drop across the orifice 33 at a substantially steady value. Thus, the rate of flow of fluid from input port 29 to port 40 will be a function of the extent of opening of orifice 33. Thus, referring back to FIG. 1, it will be understood that the hydraulic motor 12 is operated at a predetermined speed dependent upon the adjustment of the flow regulator 19. Since both the seed dispenser 10 and the D.C. generator 14 receive their driving power from the motor 12, the rate of operation of the dispenser will be controlled thereby and indicated by the output of the generator 14.

For details of the adjustable control circuit 24, reference should now be had to FIG. 3. It will be seen that the output from D.C. generator 28 is applied between a point of reference potential or ground and the input terminal 50. In similar manner the output from generator 14 is applied between ground and the second input terminal 51. The control circuit may have a third and common terminal 52 connected to ground, as shown. For convenience, the terminal 50 when associated with terminal 52 may be considered a reference input to the control circuit. The terminals 51 and 52 may be considered as a monitor input to the control circuit. Thus, a potentiometer 53 shunted by a capacitor 54 is connected across the monitor input. In similar fashion, a potentiometer 55 in series with a variable resistor 56 is connected across the reference input. A capacitor 57 is connected in shunt thereto. The slider 58 of potentiometer 53 is connected to the emitter electrode 59 of an N-P-N transistor 60. The slider 61 of potentiometer 55 is connected to the emitter electrode 62 of another N-P-N transistor 63. The emitter electrode 59 is cross-coupled through resistor 64 to the base electrode 65 of transistor 63. In like manner the emitter electrode 62 is cross-coupled through resistor 66 to base electrode 67 of transistor 60. The collector electrode 68 of transistor 60 is connected through a load resistor 69 to a junction point 70. Load resistor 71 connects the collector electrode 72 of transistor 63 to the same junction point 70. Point 70 is connected to the positive terminal of battery 25, as shown.

Also connected to junction 70 are the emitter electrodes 73 and 74 of two P-N-P transistors 75 and 76, respectively. The base electrode 77 of transistor 75 is connected through a coupling resistor 78 to the junction between resistor 71 and collector electrode 72. In like manner the base electrode 79 of transistor 76 is connected through the resistor 80 to the junction between resistor 69 and collector electrode 68.

Transistor 75 is provided with a collector electrode 81 which is connected through the winding 82 of a relay 83 to ground as shown. Transistor 76 also has a collector electrode 84 connected through the winding 85 of a second relay 86 to ground. Relay 83 is provided with a pair of fixed contacts 87 and 88. In like manner relay 86 has fixed contacts 89 and 90. The contacts 87 and 89 are each connected to ground. Contacts 88 and 90 are connected together and to junction point 70.

Relay 83 is also provided with a movable contact 91 which normally engages contact 87 and is connected to one control winding (not shown) of motor 23. The relay 86 is provided with a similar movable contact 92 which normally engages contact 89 and is connected to a second control winding (not shown) of motor 23.

As shown in FIG. 3, both relays 83 and 86 are de-energized. Thus, both control windings of motor 23 are inactive. The motor 23 is of such nature that it will rotate in one direction when its winding is energized upon contact 91 of relay 83 engaging fixed contact 88. The motor 23 will rotate in the opposite direction when its other winding is energized upon contact 92 of relay 86 engaging fixed contact 90. It will be understood that only one of the two relays, 83 or 86, will be energized at any one time.

The control circuit 24 is arranged to compare the signals obtained from the two generators 14 and 28. When the outputs of the two generators are related in inverse proportion to the relative settings of the sliders 58 and 61, the circuit will be at rest. The windings of motor 23 are connected such that if the potential on slider 61 exceeds that on slider 58, relay 86 will be energized and motor 23 will rotate in a direction to increase the flow through flow regulator 19. If the potential on slider 58 is greater than that on slider 61 the relay 83 will be energized causing motor 23 to rotate in the reverse direction and to reduce the flow of fluid through regulator 19.

It should be apparent from a consideration of FIG. 3 that transistor 60 will conduct when the potential at slider 61 exceeds that at slider 58. In like manner transistor 63 will conduct when the potential at slider 58 is greater than the potential at slider 61. Conduction of transistor 60 reduces the potential at the base electrode 79 causing transistor 76 to conduct and thereby energizing relay 86. When transistor 63 conducts it reduces the potential of the base electrode 77 causing transistor 75 to conduct and relay 83 to be energized. The two potentiometers 53 and 55 with variable resistor 56 provide a certain amount of flexibility to enable the circuit to handle any desired rate of feed of the seed being dispensed within a reasonably wide range. Normally, the potentiometer 53 and the variable resistor 56 would be preset to provide an appropriate range of operation. The operator of the equipment would only manipulate potentiometer 55 to select the desired rate of feed for the particular crop being handled. The relative settings of the variable resistor and potentiometers will determine the ratio of the speed at which the seed dispenser is operated relative to the speed of travel of the agricultural implement over the ground. The speed of travel will be sensed by the generator 28 driven by the ground wheel 26. As this speed varies the control circuit will vary the speed of operation of the seed dispenser to maintain such speed in a given relation to the ground speed. In effect, the circuit maintains the outputs from generators 14 and 28 in a predetermined ratio.

While the circuit of FIG. 3 provides for a reasonably wide range of adjustment of the application rate, a much greater range with better control can be obtained with the modification shown in FIG. 4. The circuit of FIG. 4 is intended to replace so much of FIG. 3 as appears between the terminals 50, 51 and 52, on the one hand, and the points X and Y on the other hand.

Referring to FIG. 4, the outputs of generators 14 and 28 are connected, as before, between terminals 51 and 50, respectively, and ground. Terminal 50 is connected through a first control potentiometer 93 in series with an adjustable resistor 94 to ground. Terminal 51 is similarly connected through a second control potentiometer 95 in series with an adjustable resistor 96 to ground. Potentiometer 93 has its wiper 97 connected to point X while potentiometer 95 has its wiper 98 connected to point Y. A capacitor 99 is connected, as shown, between the wipers 97 and 98. The wipers 97 and 98 are mechanically ganged for conjoint operation under the control of a knob or other manipulative element 100.

As shown in the drawing, the potentiometers 93 and 95 are oriented for reciprocal operation from the electrical viewpoint. That is, for a given direction of rotation of the knob 100, the output from one potentiometer will increase while that from the other will decrease assuming that the input voltages remain constant. This arrangement is often referred to as reciprocal ganging.

In order to linearize the scale associated with the knob 100 the potentiometers 93 and 95 may be provided, as shown, with a non-linear characteristic. A satisfactory arrangement utilizes potentiometers whose output characteristic approximates a square law. During the following discussion the output of either potentimeter 93 or 95 will be considered zero when its wiper is at the end which is closest to the adjustable resistor 94 or 96, respectively. The output of the potentiometers will be designated as unity when the wipers are at the other ends thereof. Furthermore, as indicated in the drawing, both potentiometers are arranged with the maximum rate of change of resistance at the zero output end and with the minimum rate of change at their opposite ends.

By way of example, potentiometers 93 and 95 may be arranged such that in traveling over 50% of full scale starting from the zero output end the wiper 97 of potentiometer 93 traverses 70% of the total resistance while the wiper 98 of potentiometer 95 traverses 30% of the total resistance. If resistors 94 and 96 are adjusted such that each has a resistance value equal to 46.2% of the total resistance of associated potentiometer 93, 95, respectively, it can be shown that for any given putput from generator 28 the output from generator 14 will vary approximately linearly with adjustment of knob 100 to maintain the potentials at points X and Y in balance. It can also be shown that for a given ground speed or fixed output from generator 14, and over leads 104 and 105 to minimum to maximum can be varied in the ratio approximately 1:10.

As is well known, a typical seed dispenser employs a rotating plate provided with a plurality of cavities which are filled with seed from the hopper and discharged in succession. If the plate is rotated too rapidly not all of the cavities will become filled with seed and skips will occur. Hence, a maximum limit exists for its useful operating speed. Referring again to FIG. 1, there is shown in broken lines as an optional component an overspeed alarm 101 connected over leads 102 and 103 to the output from generator 14, and over leads 104 and 105 to the source of voltage 25.

The details of alarm 101 are shown in FIG. 5 to which attention is now directed. A resistor 106 in series with a Zener diode 107 is connected via leads 104 and 105 across the source of voltage 25. It will be understood that the source will be suitably tapped in known manner to provide the proper operating voltage for the circuit being described.

The emitter 108 of a power transistor 109 is connected to the junction of resistor 106 and lead 104. Transistor 109 has its collector electrode 110 connected through a signal lamp 111 to lead 105 which is shown connected to ground at junction 112. The junction 113 between resistor 106 and Zener diode 107 is connected to the emitter electrode 114 of a P-N-P signal transistor 115. Transistor 115 has its collector electrode 116 connected to the base electrode 117 of an N-P-N signal transistor 118 whose collector electrode 119 is connected to the base electrode 120 of transistor 109. The emitter electrode 121 of transistor 118 is connected over a readily apparent circuit to grounded junction 112. Finally, the base electrode 122 of transistor 115 is connected to the slider 123 of a potentiometer whose resistance element 124 is connected between lead 102 and grounded junction 112. A capacitor 125 is connected between the base electrode 117 and the junction 112.

The operation of the circuit of FIG. 5 will now be explained. Zener diode 107 will in known manner maintain the potential on emitter electrode 114 at some fixed value relative to ground, e.g., 6.2 volts. Assuming no output from generator 14 the potential on lead 102 and, therefore, on slider 123 and base electrode 122 will be at ground. Therefore, transistor 115 will be conductive causing a charge to be developed on capacitor 125 and driving the base electrode 117 positive relative to ground. Since emitter 121 is grounded, transistor 118 will also be conductive. This, in turn, lowers the potential on base electrode 120 rendering transistor 109 conductive whereupon signal lamp 111 is illuminated.

When the planter mechanism is placed in operation, generator 14 will produce a voltage as previously explained which is a direct function of the speed of the seed dispenser. As the speed of the dispenser increases the voltage supplied to potentiometer element 124 will increase until a point is reached, determined by the setting of slider 123, where the potential on base electrode 122 approaches the potential on emitter electrode 114 and transistor 115 ceases to conduct. This will render both transistor 118 and 109 non-conductive and extinguish lamp 111. In our example, slider 123 would be adjusted such that the potential thereon will be approximately 6.2 volts when seed dispenser 10 is being driven at maximum tolerable speed.

If it is desired to reverse the significance of the signal lamp so that it goes ON rather than OFF to signal an over speed condition, the emitter electrode 114 may be interchanged with base electrode 122 with respect to their connection in the circuit. Obviously, various other signal devices may be substituted in known fashion for lamp 111.

It should now be understood that the overspeed alarm 101 when present will provide the operator with a positive warning regardless of seed spacing or other adjustment of the application rate. The operator can always operate at the highest ground speed consistent with his seed plate filling capability. The apparatus, therefore, ensures most efficient use of the equipment.

Having described the invention with reference to a seed planter, it should be apparent that it is readily adapted to the control of many other devices whose speed of operation must be controlled as a function of its movement relative to a surface. For example, the invention has been applied successfully to apparatus for applying painted lines to a roadway. Particularly, the device is suited to the painting of broken lines where the length of each segment is the same irrespective of the speed of travel of the paint applying mechanism. Numerous other changes will appear to those skilled in the art. For example, depnding upon the nature of the control desired the pressure compensated flow regulator may be replaced with a different type of throttling valve. Hence, it is desired to cover all such changes as come within the true

What is claimed is:

1. An arrangement for controlling the speed of operation of a vehicular mounted device as a function of the rate of movement of the vehicle relative to the ground comprising in combination: a rotary hydraulic motor for driving said device; means for supplying fluid under pressure to said hydraulic motor for energizing the same; control means operatively associated with said motor for controlling its speed; a first voltage generator coupled to said hydraulic motor for generating a first signal voltage proportional to the speed of rotation of said motor; a second voltage generator; means for operatively interconnecting said second voltage generator with the ground for producing a second signal voltage proportional to the ground speed of the vehicle; and an adjustable control circuit including a first potentiometer having its resistance element coupled across the voltage output of said first generator and having a slider, a second potentiometer having its resistance element coupled across the voltage output of said second generator and having a slider, the resistance element of both potentiometers extending throughout substantially the entire range of respective mechanical adjustment thereof, means coupled to said sliders for comparing the voltages thereat and for providing an output signal when said slider voltages are unequal, said last mentioned means being coupled to said control means for operating the same in response to said output signal to control the speed of said hydraulic motor to maintain it in a predetermined relation to said ground speed, and manually adjustable means ganging the sliders of said potentiometers for simultaneous reciprocal adjustment of the electrical output thereof.

2. An arrangement according to claim 1, wherein said resistance elements of the potentiometers are provided each with an approximate square law characteristic arranged to provide maximum rate of change of output adjacent the zero output end, whereby the speed of said hydraulic motor is controllable as a linear function of the adjustment of said manually adjustable means.

3. An arrangement according to claim 2, further comprising in combination means coupled to said first voltage generator for comparing the voltage produced thereby with a given reference voltage and for producing a second output signal when the magnitude of the voltage from said first voltage generator exceeds said reference voltage, and means responsive to said second output signal for providing an alarm manifestation.

4. An arrangement for controlling the speed of operation of an agricultural implement which is carried by an agricultural machine over the surface of a field, the speed of operation of the implement being controlled as a function of the ground speed of the machine, said apparatus comprising in combination: a rotary hydraulic motor operatively coupled in driving relation to said implement; means for supplying fluid under pressure so said hydraulic motor for energizing the same; control means operatively associated with said motor for controlling its speed; a first voltage generator responsive to operation of said hydraulic motor for generating a first voltage signal proportional to the speed of rotation o fthe motor; a second voltage generator for producing a second voltage signal proportional to said ground speed; and an adjustable control circuit coupling said first and second voltage generators to said control means responsive to the voltage signals thereof for controlling the speed of said motor to maintain it in a predetermined relation to said ground speed, said control circuit comprising a first potentiometer having its resistance element coupled across the voltage output of said first generator and having a slider, a second potentiometer having its resistance element coupled across the voltage output of said second generator and having a slider, means coupled to said sliders for comparing the voltages thereat and for providing an output signal when said slider voltages are unequal, said last mentioned means being coupled to said control means for operating the same in response to said output signal, and manually adjustable means ganging the sliders of said potentiometers for simultaneous reciprocal adjustment of the electrical output thereof, the resistance elements of said potentiometers being provided each with an approximate square law characteristic arranged to provide maximum rate of change of output adjacent the zero output end, whereby the speed of said hydraulic motor is controllable as a linear function of the adjustment of said manually adjustable means.

5. An arrangement for controlling the speed of operation of an agricultural implement which is carried by an agricultural machine over the surface of a field, the speed of operation of the implement being controlled as a function of the ground speed of the machine, said apparatus comprising in combination: a rotary hydraulic motor operatively coupled in driving relation to said implement; means for supplying fluid under pressure to said hydraulic motor for energizing the same; control means operatively associated with said motor for controlling its speed; first signal producing means responsive to operation of said hydraulic motor for generating a first electric signal having a parameter proportional to the speed of rotation of the motor; second signal producing means for producing a second electric signal having a parameter proportional to said ground speed; said first and second signal producing means comprising, respectively, a first and a second voltage generator whose voltage outputs vary in proportion to their speed of operation and constitute said parameters; and an adjustable control circuit coupling said first and said second signal producing means to said control means and responsive to said parameters of said signals for controlling the speed of said motor to maintain it in a predetermined relation to said ground speed, said adjustable control circuit comprising a first potentiometer having its resistance element coupled across the voltage output of said first generator and having a slider, a second potentiometer having its resistance element coupled across the voltage output of said second generator and having a slider, the resistance element of both potentiometers extending throughout substantially the entire range of respective mechanical adjustment thereof, means coupled to said sliders for comparing the voltages thereat and for providing an output signal when said slider voltages are unequal, said last mentioned means being coupled to said control means for operating the same in response to said output signal, and manually adjustable means ganging the sliders of said potentiometers for simultaneous reciprocal adjustment of the electrical output thereof.

References Cited

UNITED STATES PATENTS

| 3,344,993 | 10/1967 | Wilder et al. | 239—164 |
| 2,162,513 | 6/1939 | McShane | 318—490 X |
| 2,443,048 | 6/1948 | McComb | 318—72 X |
| 3,139,217 | 6/1964 | Mell | 222—57 |

FOREIGN PATENTS

| 1,055,361 | 1/1967 | Great Britain. |

ROBERT B. REEVES, Primary Examiner

H. S. LANE, Assistant Examiner

U.S. Cl. X.R.

222—178; 318—72